United States Patent
Pirot

(10) Patent No.: US 8,194,807 B2
(45) Date of Patent: Jun. 5, 2012

(54) METHOD TO DISCRIMINATE A REAL ECHO PEAK FROM AN ALIASED ECHO PEAK

(75) Inventor: Frederic Pirot, Argences (FR)

(73) Assignee: NXP B.V. (NL)

( * ) Notice: Subject to any disclaimer, the term of this patent is extended or adjusted under 35 U.S.C. 154(b) by 249 days.

(21) Appl. No.: 12/738,986

(22) PCT Filed: Oct. 28, 2008

(86) PCT No.: PCT/IB2008/054441
§ 371 (c)(1), (2), (4) Date: May 3, 2010

(87) PCT Pub. No.: WO2009/057040
PCT Pub. Date: May 7, 2009

(65) Prior Publication Data
US 2010/0303175 A1    Dec. 2, 2010

(30) Foreign Application Priority Data
Nov. 1, 2007   (EP) .................... 07291314

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........ 375/346; 375/260; 375/350; 375/285; 375/231; 375/232; 455/501; 455/570; 455/296; 455/307

(58) Field of Classification Search ............... 375/346, 375/350, 285, 284, 230–232, 260; 455/501, 455/570, 296, 307
See application file for complete search history.

(56) References Cited

U.S. PATENT DOCUMENTS
7,577,087 B2 * 8/2009 Palin .......................... 370/210
(Continued)

FOREIGN PATENT DOCUMENTS
EP   1 584 168 A1   10/2005
(Continued)

OTHER PUBLICATIONS

International Search Report and Written Opinion for Int'l. Patent Appln. No. PCT/IB2008/054441 (Apr. 6, 2009).

*Primary Examiner* — Phuong Phu
(74) *Attorney, Agent, or Firm* — Kramer & Arnado P.C.

(57) ABSTRACT

A method to discriminate a real echo peak from an aliased echo peak comprises: computing 'a correlation between N samples of a digital data and a copy of the same N samples delayed by a time delay $\Delta_{1,0}$ to obtain a first correlation result, time delay $\Delta_{1,0}$ being equal to a time interval T between a first and a second distinct power peaks of an estimated channel impulse response, the first peak being the highest power peak within the temporal window, and/or computing—a correlation between the N samples and a copy of the same N samples delayed by a time delay $T_{IFFT}-\Delta_{1,0}$ to obtain a second correlation result, and deciding whether the second peak is a real echo peak or an aliased echo peak based on the first and/or second correlation results.

8 Claims, 3 Drawing Sheets

U.S. PATENT DOCUMENTS

| | | | |
|---|---|---|---|
| 2003/0215029 A1* | 11/2003 | Limberg | 375/321 |
| 2003/0236074 A1* | 12/2003 | Ishii et al. | 455/69 |
| 2004/0086055 A1 | 5/2004 | Li | |
| 2004/0120409 A1 | 6/2004 | Yasotharan et al. | |
| 2005/0163258 A1 | 7/2005 | Gore et al. | |
| 2005/0213680 A1 | 9/2005 | Atungsiri et al. | |
| 2005/0249181 A1 | 11/2005 | Vijayan et al. | |
| 2006/0039460 A1 | 2/2006 | Fimoff et al. | |
| 2006/0233269 A1 | 10/2006 | Bhushan et al. | |
| 2008/0198942 A1* | 8/2008 | Akella et al. | 375/260 |
| 2008/0239941 A1* | 10/2008 | Gold-Gavriely et al. | 370/210 |
| 2008/0247476 A1* | 10/2008 | Pirot | 375/260 |

FOREIGN PATENT DOCUMENTS

| | | |
|---|---|---|
| WO | 2004/105335 A1 | 12/2004 |
| WO | 2005/002164 A1 | 1/2005 |

* cited by examiner

METHOD TO DISCRIMINATE A REAL ECHO PEAK FROM AN ALIASED ECHO PEAK

FIELD OF THE INVENTION

The present invention relates to a method, a discriminator and a receiver to discriminate real echo peaks from aliased echo peak, OFDM symbol synchronization and equalizer tuning method using this method.

BACKGROUND OF THE INVENTION

There exist methods to cancel aliased echo peaks created by aliasing phenomenon according to Shannon theory in an estimated channel impulse response of a telecommunication channel.

For example, US 2005/0213680 in the name of Atungsiri et al. describes such a method to cancel aliased echo peak in an estimated channel impulse response of a channel used in an OFDM (Orthogonal Frequency Division Multiplexing) telecommunication system.

One can also refer to this document to obtain more information on OFDM receivers.

In wireless communication system, the wireless signal emitted by an emitter may follow different paths before reaching an antenna of a receiver. In this specification, the path through which is received the signal with the highest power is called the main path. The other paths are called secondary paths.

The signal that follows a secondary path is called an echo.

Typically, the main path and the secondary paths do not have the same length.

Thus, the signal is received at time $t_1$ when it follows the main path and at time $t_2$ when it follows the secondary path. Time $t_2$ may be in advance on time $t_1$ and in this case the echo is called a "pre-echo" or behind time $t_1$ and in this case the echo is called a "post-echo".

In a real channel impulse response (CIR), an echo corresponds to an echo power peak at a time distinct from the time where appears the highest power peak corresponding to the signal that follows the main path. This echo power peak is called an echo peak in this specification whereas the highest power peak corresponding to the main path is called the main peak.

An echo peak is strongly correlated to the main peak because the echo peak is created by a copy of the signal that creates the main peak, but with an offset in time.

As explained in US 2005/0213680, aliased echo peaks can appear in an estimation of the channel impulse response (CIR) when the estimation is built from an insufficient number of sampled data. This happens according to the well-known Shannon's theory. The estimation of a channel impulse response is built over a specified temporal window. In OFDM communication systems, the temporal window is known as IFFT (Inverse Fast Fourier Transform)-window, for example.

Thus, it should be understood that an aliased echo peak corresponds to a real echo peak but is not placed at the right place in the temporal window over which the channel impulse response is estimated. From this aspect, an aliased echo peak is distinct from power peaks known as "ghost peak" or "replica peak" or "image peak" that do not correspond to a real echo. In fact, ghost peak, replica peak and image peak are generated by parasitic effects like Doppler effect but not by echo. This is an important difference because to correct the estimated channel impulse response, the ghost peak and the like have to be cancelled whereas the aliased echo peaks have to be replaced at the right place in the estimated channel impulse response.

However, the aliasing of an echo peak only appears if the time interval T between the echo and the signal that follows the main path is greater than a predetermined limit. In fact, if time interval T is inferior to this predetermined limit, the echo peak appears at the right position in the estimated channel impulse response. In this situation, the echo peak is called real echo peak in this specification.

In contrast, if time interval T is greater than the predetermined limit, aliasing occurs and the estimated channel impulse response includes an aliased echo peak instead of a real echo peak.

Most of the time, the value of time interval T is not known. Thus, it is difficult to discriminate aliased echo peaks from real echo peaks.

SUMMARY OF THE INVENTION

Accordingly, it is an object of the invention to provide a method to discriminate a real echo peak from an aliased echo peak in an estimated channel impulse response of a telecommunication channel. The invention is defined by the independent claims. Dependent claims describe advantageous implementations.

The invention provides such a method wherein the method comprises:

sampling a received analogic signal to obtain digital data corresponding to the received analogic signal, estimating the channel impulse response over a temporal window of size $T_{IFFT}$ from only a part of the digital data so that aliased echo peaks may appear in the estimated channel impulse response, computing a correlation between N samples of the digital data and a copy of the same N samples delayed by a time delay $\Delta_{1,0}$ to obtain a first correlation result, time delay $\Delta_{1,0}$ being equal to a time interval T between a first and a second distinct power peaks of the estimated channel impulse response, the first peak being the highest power peak within the temporal window, and/or d) computing a correlation between the N samples and a copy of the same N samples delayed by a time delay $T_{IFFT}-\Delta_{1,0}$ to obtain a second correlation result, and deciding whether the second peak is a real echo peak or an aliased echo peak based on the first and/or second correlation results.

The above method uses the fact that a time interval $T_2$ between an aliased echo peak and the main peak is different from a time interval $T_3$ between the main peak and the real echo peak corresponding to this aliased echo peak. Thus, the result of the correlation of the received signal with a copy of the same received signals but delayed by $T_2$ should be nearly null. In contrast, the result of a correlation of the received signal with a copy of the same received signal delayed by $T_3$, should be far from zero. As a result, it is possible to discriminate a real echo peak from an aliased echo peak from those results of correlation.

The embodiment of the above terminal may comprise one or several of the following features:

the sampling frequency used in step a) corresponds to a sampling period $T_e$, and step c) or d) is also iterated with other time delays equal to $T \pm i \cdot T_e$, where i is a non-zero positive integer and "·" is the symbol of the multiplication so as to obtain a plurality of first or second correlation results, and wherein during step e), it is decides whether the second peak is a real or an aliased echo peak based on the plurality of first or second correlation results, the estimation of the channel impulse response is carried out from predetermined pilots present in OFDM (Orthogonal Frequency Division Multiplexing) symbols, the predetermined pilots being arranged with the OFDM symbols at frequency interval corresponding to n carrier frequencies and their position being shifted by k carrier frequencies from one OFDM symbol to the following one so that m*k=n, m, n and k being integer numbers greater than one, and wherein $T_{IFFT}$ is equal to m/n*$T_u$, where $T_u$ is the duration of the modulation of an OFDM symbol, the N samples are temporal successive digital data and N is chosen so that N·$T_e$ is greater than or equal to k·$T_u$, and preferably greater than or equal to 16·$T_u$, and the method comprises both steps c) and d), and wherein if the first correlation result or the plurality of first correlation results are greater than the second correlation result or the plurality of second correlation results, then it is decided that the second peak is a real peak, else it is decided that the second peak is an aliased peak.

The above embodiments of the terminal present the following advantages:

using a plurality of first and second correlation results increases the reliability of the method in particular when the received echo is highly spreaded choosing N so that N·$T_e$ is greater than or equal to 4 $T_u$ in an OFDM system increases the reliability of the correlation result.

The invention also relates to a fine OFDM symbol synchronization method as well as an equalizer tuning method, which uses the above discriminating method.

The invention also relates to a discriminator and a receiver implementing the above method.

DETAILED DESCRIPTION OF THE EMBODIMENTS

Figure 1:
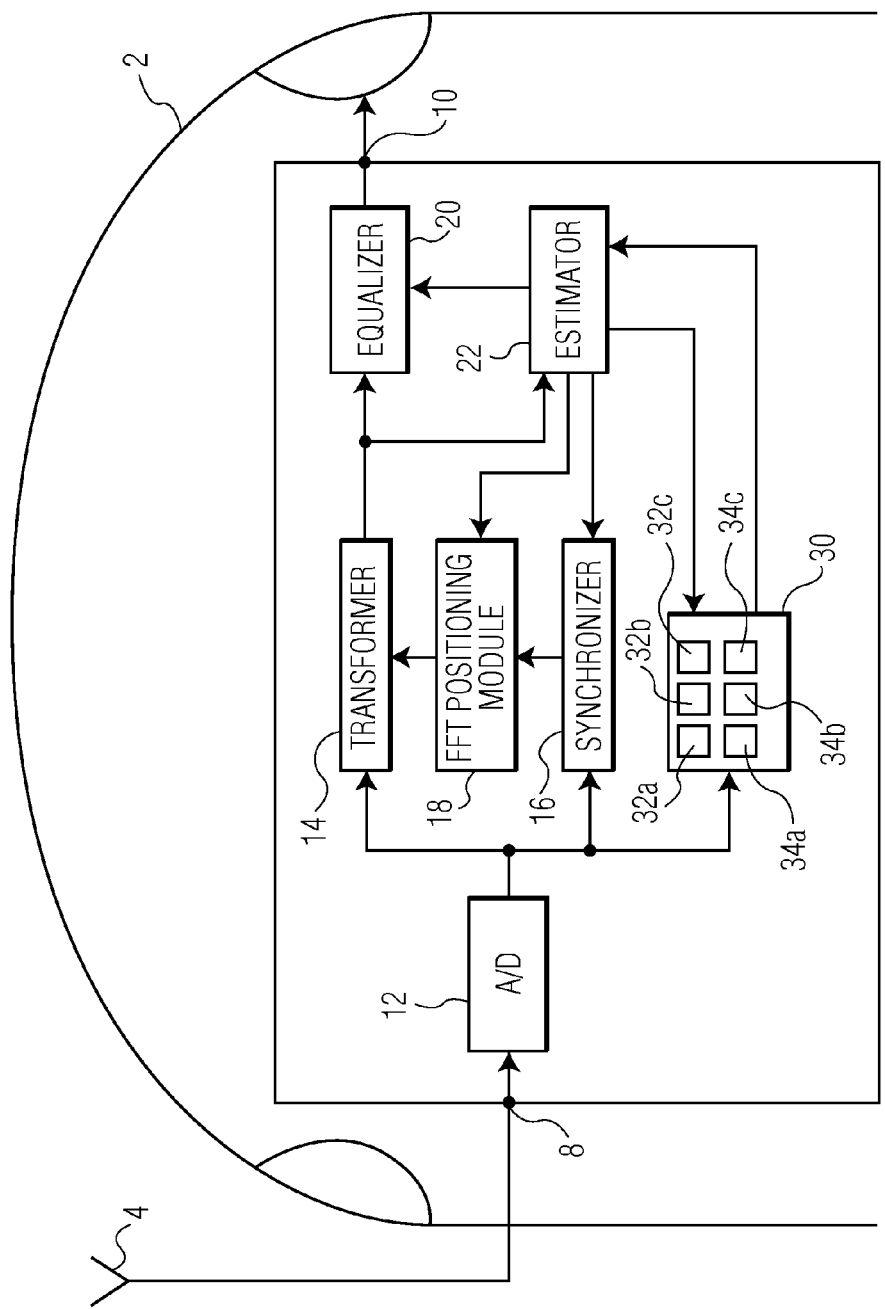
FIG. 1 is a schematic diagram of the structure of a terminal having an OFDM symbol receiver.

FIG. 1 shows a DVB-T (Digital Terrestrial Video Broadcasting) terminal 2. For example, terminal 2 is a mobile phone or a Set top Box.

Terminal 2 is adapted to receive wireless signals according to an OFDM communication protocol. The signal is a multicarrier signal used to transport OFDM symbols.

The structure of terminals to receive OFDM symbols is well known so, for simplicity, FIG. 1 shows only the details necessary to understand the invention. Terminal 2 has an antenna 4 to receive an analogic wireless signal and an OFDM symbol receiver 6 connected to antenna 4 through an input 8. For example, receiver 6 is a radio frequency receiver which outputs a digital bit stream corresponding to the received signal through an output 10.

Receiver 6 has an analogue-to-digital converter 12 connected to input 8 to obtain digital data corresponding to the received analogic wireless signal. Converter 12 samples the received analogic signal with a frequency $f_e$ that corresponds to a sampling period $T_e$.

The obtained digital data are sent to a Fast Fourier Transformer 14 and a coarse synchronizer 16, inputs of which are connected to an output of converter 12.

Transformer 14 is designed to perform FFT (Fast Fourier Transform) on the received signal during a FFT-window.

Synchronizer 16 is intended to perform a coarse OFDM symbol synchronization that consists in estimating the FFT-window position accurately enough so that post-FFT operations can be performed.

Synchronizer 16 outputs a coarse tuning instruction to a FFT-window positioning module 18. Module 18 tunes the FFT-window position of transformer 14 according to the coarse FFT-window position estimation as well as, if available, to an estimated channel impulse response (CIR). More precisely, module 18 is able to fine-tune the position of the FFT-window according to the position of the peaks in the estimated channel impulse response. Then, module 18 outputs a tuning instruction to transformer 14 to fine-tune the FFT-window position.

Post-FFT operations relate to operations carried out on the symbols in the frequency domain outputted by transformer 14 like forward error correction, for example.

An equalizer 20 that equalizes the digital data in the frequency domain is connected at an output of transformer 14. Equalizer 20 is a tunable equalizer having at least one coefficient that is automatically tuned according to an estimation of the channel impulse response of the channel through which is received the wireless signal.

Receiver 6 has a channel impulse response estimator 22 to build the estimated channel impulse response from scattered pilots present in the received signal. An input of estimator 22 is connected to an output of transformer 14 to receive OFDM symbols in the frequency domain. Estimator 22 is able to output the estimated channel impulse response to module 18 and equalizer 20.

More precisely, pilots are predetermined symbols that are known by receiver 6 before they are received. Pilots are repeatedly sent in the signal so that the receiver can build an estimated channel impulse response. For example, scattered pilots are continuously sent during all the reception of these signals. For instance, in DVB-T standard, one predetermined pilot is shifted by k carrier frequencies from one symbol to the next one so that it is sent on the same frequency carrier every m OFDM symbols having pilots. Within one OFDM symbol, predetermined pilots are arranged on carrier frequencies, which are spaced apart by n carrier frequencies. Thus m*k=n, where m, k and n are integer greater than one. For example, m equal 4, k equal 3, and n equal 12. This is a well-known process and will not be described in further details.

Receiver 6 has a discriminator 30 able to discriminate a real echo peak from an aliased echo peak in the channel impulse response outputted by estimator 22. To do so, discriminator 30 has a plurality of autocorrelator $32_a$ to $32_c$ and $34_a$ to $34_c$.

Each of these correlators is able to correlate N samples of the digital data in the time domain, i.e. before transformer 14, with a copy of the same N samples delayed by a predetermined time interval. To this end, discriminator 30 is connected to an input of transformer 14 and to estimator 22.

Figure 2:
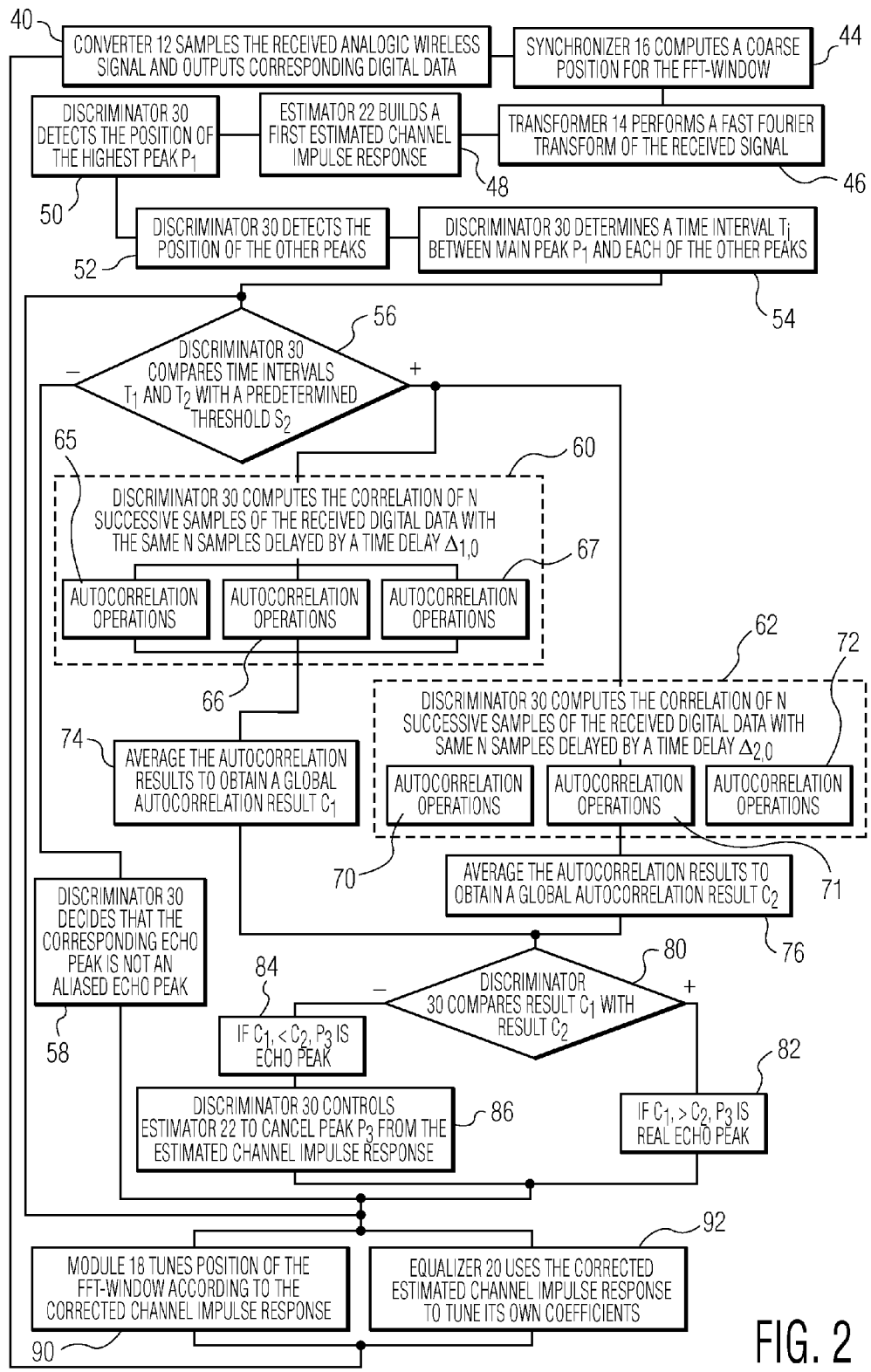
FIG. 2 is a flowchart of a fine OFDM symbol synchronization method.

The operation of receiver 6 will now be described with reference to FIGS. 2, 3 and 4.

Initially, in step 40, the converter 12 samples the received analogic wireless signal and the converter 12 outputs corresponding digital data.

In step 44, synchronizer 16 computes a coarse position for the FFT-window and outputs it to module 18. Coarse synchronization may be done according to the method disclosed in the patent application WO 2005/002164.

Then, in step 46, transformer 14 performs a Fast Fourier Transform of the received signal during the time interval defined by the FFT-window and outputs the received OFDM symbols in the frequency domain.

Subsequently, in step 48, estimator 22 builds a first estimated channel impulse response using only the scatter pilots present in the symbols outputted by transformer 14. The first estimated channel impulse response represents the channel power characteristic in the time domain in response to a predetermined impulse. Typically, the channel impulse response is computed using an IFFT (Inverse Fast Fourier Transform) within an IFFT-window. The IFFT-window is m·

$$\frac{T_u}{n}$$

wide, where $T_u$ is the duration of the modulation of an OFDM symbol that corresponds to the duration of an OFDM symbol minus the guard interval. m and n are the integer number previously defined.

Figure 3:
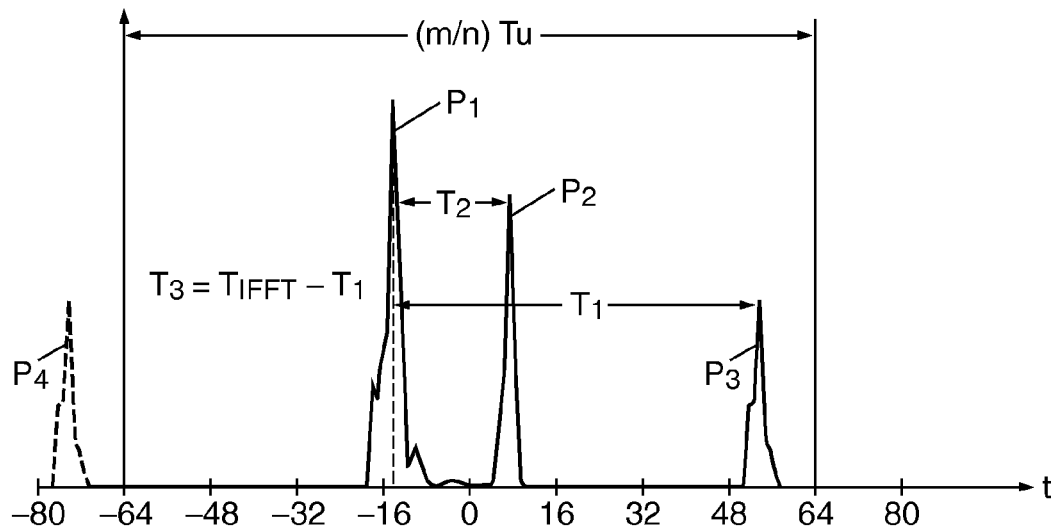
FIG. 3 is a draft of an estimated channel impulse response.

FIG. 3 shows an example of an estimated channel impulse response built by estimator 22 during step 48.

The estimated channel impulse response has three power peaks $P_1$, $P_2$ and $P_3$ within the IFFT-window. $P_1$ is the highest peak and corresponds to the main peak.

In the following part of the specification, we assume that $P_2$ is a real echo peak whereas $P_3$ is an aliased echo peak. In fact, peak $P_3$ corresponds to a real peak $P_4$ which is received just before the beginning of the IFFT-window. Thus, real echo peak $P_4$ is not visible in the estimated channel impulse response outputted by estimator 22.

Next, we assume that the estimated channel impulse response built during step 48 is the one shown in FIG. 3.

The estimated channel impulse response is outputted to discriminator 30.

In step 50, discriminator 30 detects the position of the highest peak $P_1$. Then, in step 52, discriminator 30 detects the position of the other peaks. For example, discriminator 30 considers that there exists a peak if this peak is higher than a threshold $S_1$. For example, threshold $S_1$ is set to be equal to A/q, where A is the amplitude of the main peak detected in step 50 and q is positive non zero integer. For example, q is greater than $\overline{4}$ and smaller than 128. In this embodiment, $\overline{q}$ is equal to 128.

Thereafter, in step 54, discriminator 30 determines a time interval $T_i$ between main peak $P_1$ and each of the other peaks within the IFFT-window.

Here, time interval $T_1$ refers to the time interval between peak $P_1$ and $P_3$ and time interval $T_2$ refers to the time interval between peak $P_1$ and peak $P_2$.

In step 56, discriminator 30 compares time intervals $T_1$ and $T_2$ with a predetermined threshold $S_2$. If a time interval is smaller than or equal to threshold $S_2$, then, in step 58, discriminator 30 decides that the corresponding echo peak is not an aliased echo peak without any further computation. This results from the fact that it is highly probable that an echo peak, which is very close from the main peak, is a real echo peak.

For example, threshold $S_2$ is smaller than or equal to $T_u/2n$.

In contrast, for each echo peak which is spaced apart from the main peak by more than $S_2$, then:

in step 60, discriminator 30 computes the correlation of N successive samples of the received digital data with a copy of the same N samples delayed by a time delay $\Delta_{1,0}$ equal to time interval $T_1$, and in step 62, discriminator 30 computes the correlation of the N successive samples of the received digital data with a copy of the same N samples delayed by a time delay $\Delta_{2,0}$ equal to $T_{IFFT}-\Delta_{1,0}$, where $T_{IFFT}$ is the IFFT-window size.

For instance, N is chosen so that $N \cdot T_e$ is at least greater than $T_u$ and preferably greater than $4 \cdot T_u$ or even greater than $16 \cdot T_u$.

More precisely, in step 60, discriminator 30 computes other auto-correlation with a time delay $\Delta_{1,i}$. Time delays $\Delta_{1,i}$ is computed according to the following relation: $\Delta_{1,i}=T_1+i \cdot T_e$, where "i" is an integer that can be positive or negative.

Typically, the absolute value of "i" is never greater than N/100.

For instance, in this embodiment, only two other time delays $\Delta_{1,-1}$ and $\Delta_{1,1}$ are used.

Accordingly, step 60 includes three autocorrelation operations 65 to 67 using time delays $\Delta_{1,-1}$, $\Delta_{1,0}$ and $\Delta_{1,1}$, respectively. Each one of these operations 65 to 67 is carried out in parallel by a corresponding correlator $32_a$ to $32_c$.

Similarly, step 62 includes three autocorrelation operations 70 to 72 using time delay $T_{IFFT}-\Delta_{1,-1}$; $T_{IFFT}-\Delta_{1,0}$ and $T_{IFFT}-\Delta_{1,1}$. Operations 70 to 72 are carried out in parallel by corresponding auto-correlators $34_a$ to $34_c$.

Once the autocorrelation operations 65 to 67 have been carried out, in step 74, discriminator averages or accumulates the autocorrelation results to obtain a global autocorrelation result $C_1$ based on each one of the autocorrelation results.

Similarly, once the autocorrelation operations 70 to 72 have been carried out, in step 76, a global autocorrelation result $C_2$ is obtained by averaging or accumulating each one of the autocorrelation results from operation 70 to 72.

Subsequently, in step 80, discriminator 30 compares result $C_1$ with result $C_2$.

If result $C_1$ is greater than result $C_2$, then in step 82, discriminator 30 decides that peak $P_3$ is a real echo peak so that there is no need to cancel this real echo peak from the estimated channel impulse response.

In contrast, if result $C_1$ is smaller than result $C_2$, in step 84, discriminator 30 decides that peak $P_3$ is an aliased echo peak.

Subsequently, in step 86, discriminator 30 controls estimator 22 to cancel peak $P_3$ from the estimated channel impulse response. Preferably, estimator 22 replaces peak $P_3$ by an identical peak $P_4$ which is offset from peak $P_3$ by a time interval equal to $T_{IFFT}$ either in the left direction or in the right direction. In fact, it is assumed that offsetting peaks $P_3$ in the right direction results in an echo peak at position $e_1$ and that offsetting peak $P_3$ in the left direction results in an echo peak at position $e_2$. To decide in which direction peak $P_3$ should be offset, in this embodiment, corrector 24 always chooses the position $e_1$ or $e_2$ which is the closest from the main peak position.

Accordingly, in FIG. 3, peak $P_3$ is offset in the left direction and replaced by peak $P_4$.

Steps 56 to 86 are iterated for each echo peak within the IFFT-window of the estimated channel impulse response to obtain a corrected channel impulse response. Once this has been done for every one of the echo peaks, the corrected estimated channel impulse is outputted to module 18 and equalizer 20. Then, in step 90, module 18 tunes the position of the FFT-window according to the corrected channel impulse response. For example, module 18 uses the position of peak $P_1$.

In parallel, in step 92, equalizer 20 uses the corrected estimated channel impulse response to tune its own coefficients. Subsequently, equalizer 20 equalizes the output of transformer 14 to correct errors due to disruption of the channel through which are received these data.

Figure 4A:
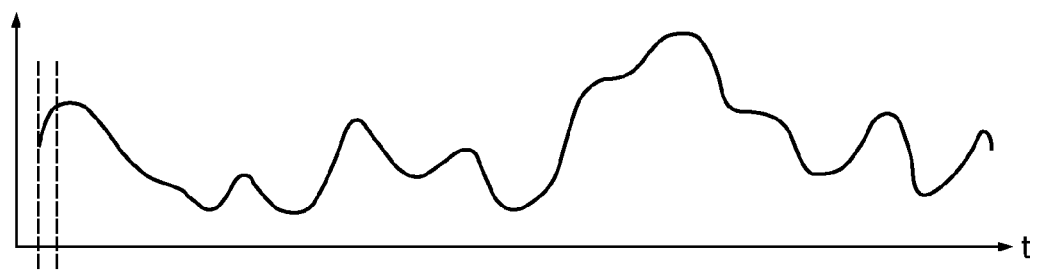
FIGS. 4A and 4B are draft of a signal through a main path and of an echo of this signal.
Figure 4B:
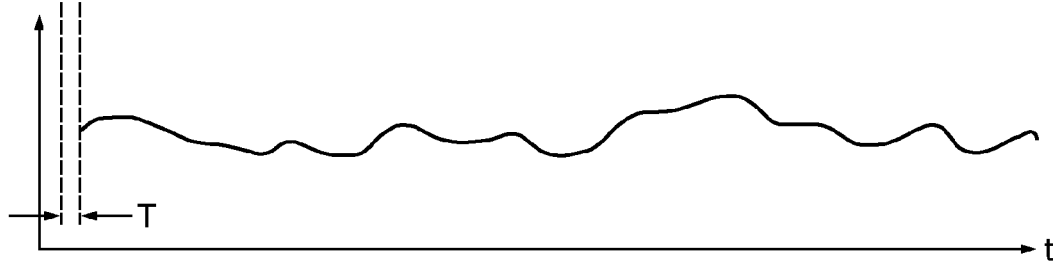

FIG. 4A shows the analogic signal received through a main path. FIG. 4B shows an echo of this same signal received through a secondary path, which is longer than the main path. As a result, the echo is delayed by a time interval T in comparison to the signal received through the main path. In such a situation, the real channel impulse response has a real echo peak which is delayed by T from the main peak. We also assume that there is no other echo.

Thus, the correlation result of the received signal by a copy of the received signal delayed by a time delay different from T will result in a value close to zero because the transmitted data in the signal are supposed not to be correlated in the time domain. On the other hand, the correlation result of the received signal by a copy of the received signal delayed by time delay T will result in a value greatly different from zero. For instance, in this situation, the result of the correlation of the received signal by a copy of the received signal delayed by $T_{IFFT}$-T will result in a value nearly null. As a consequence, an aliased echo peak can be discriminated from a real echo peak.

Many other embodiments are possible. For example, only one correlation is carried out in step 60 and 62. Preferably, the only one correlation will be the correlation using time delay $\Delta_{1,0}$. This simplifies the method of FIG. 2 while still obtaining good results for receiver implemented in a non-mobile terminal. A terminal is considered as non-mobile if it does not move at a speed greater than 10 Km/h.

In a very simple embodiment, either step 60 or step 62 is cancelled. Then, in step 80, the global result $C_1$ or $C_2$ is compared to a predetermined threshold $S_3$ to discriminate between a real echo peak and an aliased echo peak.

In another embodiment, the N samples used to compute the correlation are not necessarily successive.

Receiver 6 and the corresponding method have been described in the particular case of an OFDM receiver. However, the above teaching can be applied in any telecommunication system in which the estimation of the channel impulse response may include aliased echo peaks due to sub-sampling. For example, the above method can be used in WIFI telecommunication systems.

The invention claimed is:

1. A method, performed by a discriminator or a receiver, for discriminating a real echo peak from an aliased echo peak created by aliasing phenomenon in an estimated channel impulse response of a telecommunication channel, the method comprising steps of:
   a) sampling a received analogic signal for obtaining digital data corresponding to the received analogic signal,
   b) estimating the channel impulse response over a temporal window of size $T_{IFFT}$ from only a part of the digital data so that aliased echo peaks may appear in the estimated channel impulse response,
   c) computing a correlation between N samples of the digital data and a copy of the same N samples delayed by a time delay $\Delta_{1,0}$ to obtain a first correlation result, time delay $\Delta_{1,0}$ being equal to a time interval T between a first and a second distinct power peaks of the estimated channel impulse response, the first peak being the highest power peak within the temporal window, and/or
   d) computing a correlation between the N samples and a copy of the same N samples delayed by a time delay $T_{IFFT}$-$\Delta_{1,0}$ to obtain a second correlation result, and
   e) deciding whether the second peak is a real echo peak or an aliased echo peak based on the first and/or second correlation results.

2. A method as in claim 1, wherein the sampling frequency used in step a) corresponds to a sampling period $T_e$, and wherein step c) or step d) is also iterated with other time delays equal to T±i·$T_e$, where i is a non-zero positive integer and "·" is the symbol of the multiplication so as to obtain a plurality of first or second correlation results, and wherein during step e), it is decided whether the second peak is a real or an aliased echo peak based on the plurality of first or second correlation results.

3. A method according to claim 1, wherein the estimation of the channel impulse response is carried out from predetermined pilots present in Orthogonal Frequency Division Multiplexing symbols, the predetermined pilots being arranged with the Orthogonal Frequency Division Multiplexing symbols at frequency interval corresponding to n carrier frequencies and their position being shifted by k carrier frequencies from one Orthogonal Frequency Division Multiplexing symbol to the following one so that m*k=n, m, n and k being integer numbers greater than one, and wherein $T_{IFFT}$ is equal to m/n*$T_u$, where $T_u$ is the duration of the modulation of an Orthogonal Frequency Division Multiplexing symbol.

4. A method according to claim 3, wherein the N samples are temporal successive digital data and N is chosen so that N·$T_e$ is greater than or equal to k·$T_u$.

5. A method according to claim 1, wherein the method comprises both steps c) and d), and wherein if the first correlation result or the plurality of first correlation results are greater than the second correlation result or the plurality of second correlation results, then it is decided that the second peak is a real peak, and otherwise it is decided that the second peak is an aliased peak.

6. A fine Orthogonal Frequency Division Multiplexing symbol synchronization method comprising steps of:
   1) discriminating a real echo peak from an aliased echo peak according to the method of claim 1,
   2) correcting the estimated channel impulse response from the result of step 1) to obtain a corrected estimated channel impulse response, and
   3) fine tuning the position of a time domain to frequency domain window used to receive Orthogonal Frequency Division Multiplexing symbols, based on the position of at least one power peak in the corrected channel impulse response.

7. An equalizer tuning method comprising steps of:
   1) discriminating a real echo peak from an aliased echo peak according to the method of claim 1,
   2) correcting the estimated channel impulse response from the result of step 1) to obtain a corrected estimated channel impulse response, and
   3) tuning at least a coefficient of the equalizer based on the corrected estimated channel impulse response.

8. A method as in claim 4, wherein N is chosen so that N·$T_e$ is greater than or equal to 16·$T_u$.

* * * * *